United States Patent
Moyes et al.

(10) Patent No.: US 7,465,334 B2
(45) Date of Patent: Dec. 16, 2008

(54) ZINC RECOVERY PROCESS

(75) Inventors: John Moyes, Sydney (AU); Frank Houllis, Sydney (AU)

(73) Assignee: INTEC Ltd., Sydney, NSW (AU)

( * ) Notice: Subject to any disclaimer, the term of this patent is extended or adjusted under 35 U.S.C. 154(b) by 425 days.

(21) Appl. No.: 10/488,916

(22) PCT Filed: Sep. 12, 2002

(86) PCT No.: PCT/AU02/01260

§ 371 (c)(1),
(2), (4) Date: Apr. 26, 2004

(87) PCT Pub. No.: WO03/023077

PCT Pub. Date: Mar. 20, 2003

(65) Prior Publication Data

US 2004/0237720 A1    Dec. 2, 2004

(30) Foreign Application Priority Data

Sep. 13, 2001  (AU)  .................................... PR 7667
Sep. 13, 2001  (AU)  .................................... PR 7669
Sep. 13, 2001  (AU)  .................................... PR 7670

(51) Int. Cl.
C22B 3/06    (2006.01)
C22B 19/20   (2006.01)
C01G 9/02    (2006.01)
C25C 1/16    (2006.01)

(52) U.S. Cl. .......................... 75/743; 423/101; 423/109; 205/606

(58) Field of Classification Search .................... 75/725, 75/742, 743; 423/101, 109; 205/606
See application file for complete search history.

(56) References Cited

U.S. PATENT DOCUMENTS 3,652,264 A * 3/1972 Bodson ....................... 423/104

(Continued)

FOREIGN PATENT DOCUMENTS

CA    2 134 586    5/1995

(Continued)

OTHER PUBLICATIONS

Krishnamurti et al., "Influence of Manganese oxide minerals on the formation of iron oxides", Clays and Clay Minerals, vol. 36, No. 5 467-475, 1988.*

Primary Examiner—Roy King
Assistant Examiner—Tima M McGuthry-Banks
(74) Attorney, Agent, or Firm—Gerald T. Shekleton; Welsh & Katz Ltd.

(57) ABSTRACT

A process for the recovery of zinc metal from a zinc mineral includes the steps of leaching the zinc mineral in a solution including a halide species formed from two or more different halides, to leach the zinc into the solution. The zinc-bearing solution is then electrolyzed to yield zinc metal and to generate the halide species. The electrolyzed solution including the halide species is then returned to the leaching step. A portion of the electrolyzed solution can be removed as a bleed stream from a cathode compartment of an electrolytic cell of the electrolysis process and processed to remove manganese as manganese dioxide precipitate by adding thereto limestone, and the halide species from an anode compartment of the electrolysis process. In this regard, the pH and Eh of the solution can regulated in a manner that favors the formation of the manganese dioxide precipitate over the formation of a precipitate of zinc.

19 Claims, 4 Drawing Sheets

U.S. PATENT DOCUMENTS

| | | | |
|---|---|---|---|
| 3,764,490 A * | 10/1973 | Chambers | 205/353 |
| 3,973,949 A | 8/1976 | Goens et al. | |
| 4,071,421 A | 1/1978 | Masters et al. | |
| 4,206,023 A * | 6/1980 | Au | 205/606 |
| 4,272,341 A | 6/1981 | Lamb | |
| 4,292,147 A * | 9/1981 | Fray et al. | 205/342 |
| 4,346,062 A | 8/1982 | Au | |
| 5,536,297 A * | 7/1996 | Marchbank et al. | 75/736 |
| 5,785,736 A * | 7/1998 | Thomas et al. | 75/736 |
| 6,395,242 B1 * | 5/2002 | Allen et al. | 423/101 |

FOREIGN PATENT DOCUMENTS

| | | |
|---|---|---|
| EP | 0885 976 B1 | 3/2002 |
| GB | 2 051 871 | 1/1981 |
| WO | WO 94/00606 | 1/1994 |
| WO | WO 00/61826 | 10/2000 |

\* cited by examiner

ZINC RECOVERY PROCESS

FIELD OF THE INVENTION

The present invention relates to a process for the recovery of zinc from a zinc ore using a halide-based leaching solution. The invention also relates to a method for removing manganese from zinc and other metal halide solutions, and especially zinc and/or lead halide solutions. Further, the invention relates to a method for removing silver and/or mercury from metal halide solutions, especially zinc or cuprous chloride solutions (eg. in a hydrometallurgical process for zinc or copper production).

BACKGROUND TO THE INVENTION

An existing process for zinc production involves roasting of a zinc containing ore, followed by acid sulphate leaching and then electrolytic recovery of zinc from the leachate. The roasting process produces sulphur-based pollutant gases which must be removed from the roasting furnace exhaust. In addition, if the ore contains high levels of impurities this can adversely affect the electrolysis and purity of zinc produced. For example, many zinc ores contain significant quantities of manganese. The existing process is constrained in its ability to treat zinc mineral concentrates containing significant manganese, as the manganese leaches into the leachate along with the zinc and cannot be effectively removed. Manganese causes problems in the zinc electrolytic recovery step by depositing on the anodes as $MnO_2$.

In Australian Patent 669906, the present applicants developed a multi-stage leaching process followed by electrolysis for the recovery of copper. Conversely, U.S. Pat. No. 4,292,147 discloses a process for the recovery of zinc using chloride leaching followed by electrolysis.

The present inventors have also discovered that, when solution, manganese does not deposit on the anode during electrolytic metal recovery from the solution, especially with solutions derived from the leaching of zinc and/or lead ores. This allows for the manganese to be removed from the solution by other means.

Furthermore, in hydrometallurgical processes that have a high solution halide concentration (eg. from 200 to 300 grams per litre NaCl and 10 to 50 grams per litre NaBr), it is desirable to remove deleterious impurities prior to the electrowinning of various metals such as zinc or copper in the process. Many impurities can be removed from the electrolyte solutions of these processes by a stepwise pH adjustment and precipitation (eg. up to around pH 6), however, both silver and mercury are not so readily removed.

U.S. Pat. No. 4,124,379 discloses the removal of silver from a cuprous chloride electrolyte, whereby copper metal is added to the electrolyte to reduce cupric ions to cuprous ions followed by contact with an amalgam that exchanges a metal for the silver. The amalgam is formed from mercury metal with one of copper, zinc or iron, preferably copper shot coated or associated with mercury metal. The amalgam requires separate production, requiring a physical association with the mercury and copper, and this is cumbersome and complex, adding to the cost of the process. In addition, the amalgam must then be added to the process and contacted with the silver-bearing electrolyte, increasing the complexity and cost of running the process.

SUMMARY OF THE INVENTION

In a first aspect, the present invention provides a process for the recovery of zinc metal from a zinc mineral comprising the steps of:
leaching the zinc mineral in a single stage using a solution including a halide species formed from two or more different halides, to leach the zinc into the solution;
electrolysing the zinc-bearing solution to yield zinc metal and to generate the halide species; and
returning the electrolysed solution including the halide species to the leaching step.

The present inventors have surprisingly discovered that halide species formed from two or more different halides have sufficiently high oxidising potential such that zinc (and other metals such as lead) can be directly leached into solution in a single stage without the need for a multi-stage leaching operation (for example, as disclosed in the applicant's Australian patent 669906).

Typically the halide species is anodically formed (ie. at the anode) in the electrolysis step. Typically the halide species is formed at an oxidation potential lower than that for the formation of many insoluble forms of impurities in the solution. For example, typically the halide species is formed at an oxidation potential lower than that for manganese dioxide. This enables the impurities to be maintained in solution, and then removed from the solution, either in-line or in a separate removal stage.

Preferably the two or more different halides are chlorine and bromine, and preferably the halide species is a soluble halide complex formed at the anode, such as $BrCl_2^-$, although BrCl gas may also be formed and then used. Such species have been discovered to be highly oxidising of zinc mineral (and other minerals) so that only a single-stage zinc leaching process is required.

Preferably the leaching of the mineral is facilitated by a catalyst, which typically catalyses the oxidation of the mineral by the halide species. In this regard, preferably the catalyst is a metal catalyst, such as copper, which can be present in the zinc ore or introduced into the leaching process (eg. as particulate copper in a first stage leaching).

Preferably the process further comprises one or more subsequent stage(s) to provide for zinc leaching in the single stage and removal of impurities in the subsequent stage(s). In this regard, preferably at least two subsequent stages are coupled to the leaching process; so that the process includes a first stage for zinc leaching, a second aeration stage and a third sulphate precipitation stage.

Preferably air is introduced in the second stage to oxidise and precipitate any iron present in the zinc mineral. Preferably when sulphur is present in the mineral limestone is added in the third stage to precipitate sulphate resulting from sulphur oxidation in the first stage leaching, as calcium sulphate.

Preferably leachate from the leaching process has these solid precipitates separated therefrom and, prior to electrolysis, any gold and platinum group metals (PGM's) present therein are preferably removed by passing the leachate over activated carbon (typically a column thereof) to adsorb the gold and PGM's onto the carbon.

Preferably prior to electrolysis the leachate is then passed to a series of cementation processes in which zinc dust (typically using a portion of zinc produced in the electrolysis process) is added to the leachate to cement out any copper, silver, lead and other impurities present in the leachate (as a result of being present in the mineral).

Preferably prior to electrolysis and, if necessary, the leachate is then passed to a further iron (and residual metals)

removal stage in which limestone and a halide species from the electrolysis step are added to oxidise and precipitate iron as ferric oxide. Preferably in this same stage, the limestone and halide species will oxidise and precipitate at least a portion of the manganese present as manganese dioxide.

Preferably a portion of the electrolysed solution (typically spent catholyte) is removed and processed to remove manganese therefrom. Preferably said portion is a bleed stream from a cathode compartment of an electrolytic cell for the electrolysis process, the bleed stream having added thereto limestone and the halide species from an anode compartment of the electrolysis process, to precipitate manganese dioxide.

In the manganese removal stage, preferably the pH and Eh of the solution are regulated in a manner that favours the formation of the manganese dioxide precipitate over the formation of a precipitate of zinc.

Preferably the pH is regulated by the incremental addition of the limestone to raise the solution pH to a level at which the Eh can be increased by the halide species to a level at or above which $MnO_2$ formation is favoured. Preferably the amount of limestone added is less than the stoichiometric amount required for $MnO_2$ formation, such that less of the zinc is precipitated.

Preferably prior to returning the electrolysed leachate to the leaching process and, if necessary, a portion of the catholyte (typically that in which manganese has been removed therefrom) is passed to a magnesium removal stage in which slaked lime is added to firstly remove any zinc (which is returned to the leaching process) and then to remove the magnesium as a magnesium oxide precipitate.

Therefore, in a second aspect the present invention provides a method for the removal of manganese from a metal halide solution that is subjected to electrolysis to yield one or more metals, including the steps of:

in the electrolysis, cathodically recovering the one or more metals whilst anodically forming a halide species from two or more different halides at an oxidation potential lower than that for the formation of manganese dioxide;

removing a portion of the solution and processing it to remove manganese therefrom; and returning the processed portion to the metal halide solution.

By forming a halide species at an oxidation potential lower than that for the formation of manganese dioxide the manganese can be maintained in solution, and this then enables it to be removed therefrom, typically in a separate stage.

Preferably the metal halide solution is a leachate resulting from a leaching process in which a mineral concentrate is leached in a halide containing solution to leach the one or more metals into solution, most preferably a zinc halide leachate from the first aspect.

Preferably the leachate is fed to the electrolysis step as electrolyte and, after electrolysis, is returned to the leaching process for further leaching of the mineral concentrate. In this regard, preferably the manganese removal method of the present invention is conducted as part of a closed loop mineral leaching and electrolytic recovery process.

Preferably the portion of solution that is removed and processed to remove manganese therefrom is a bleed stream from the closed loop mineral leaching and electrolytic recovery process, which stream is returned to that process after manganese removal.

Preferably the leaching of mineral is facilitated by the anodically formed halide species, which is preferably returned with the electrolyte to the leaching process.

Preferably the two or more different halides are chlorine and bromine, and preferably the halide species is a soluble halide complex formed at the anode, such as $BrCl_2^-$, although $BrCl$ gas may also be used.

Preferably the leaching of the mineral is facilitated by a catalyst, which typically catalyses the oxidation of the mineral by the halide species. In this regard, preferably the catalyst is a metal catalyst such as copper which is present in or introduced into the leaching process.

Preferably the mineral includes zinc and/or lead, being the metal(s) yielded in the electrolysis step.

Preferably the manganese in said portion of solution is separated therefrom by the incremental addition of an alkali reagent, preferably a reagent that causes the manganese to precipitate as $MnO_2$. The $MnO_2$ precipitate can then be separated from the portion of solution before it is returned to the metal halide solution. Preferably the portion of solution is a portion of catholyte from the electrolysis step, typically spent catholyte.

Preferably the alkali reagent is calcium carbonate. When the metal to be recovered also has a tendency to precipitate with the addition of an alkali reagent such as calcium carbonate (eg. such as zinc) preferably the alkali reagent is added in an amount less than the stoichiometric amount for $MnO_2$ formation. Preferably a high redox reagent is also added to increase the oxidation potential of the portion of solution to a level which favours the formation of $MnO_2$. In this regard, preferably the high redox reagent is the halide species (or a gaseous form thereof) anodically formed in the electrolysis step. Alternatively, the high redox reagent can be a hypochlorite or hypobromite salt (such as calcium hypochlorite) that is added to the portion of solution together with the alkali reagent.

Following from this, in a third aspect the present invention provides a method for the removal of manganese from a metal halide solution from which at least one metal can be yielded, including the steps of:

regulating the pH and Eh of the solution in a manner that favours the formation of a manganese dioxide precipitate over the formation of a precipitate of the at least one metal; and removing the manganese dioxide precipitate from the solution.

Preferably the pH is regulated by the incremental addition of an alkali reagent to raise the solution pH to a level at which the Eh can be increased to a level at or above which $MnO_2$ formation is favoured. Preferably the amount of alkali reagent added is less than the stoichiometric amount required for $MnO_2$ formation, such that less of the at least one metal is precipitated.

Preferably the pH is raised by the addition of calcium carbonate, and preferably the Eh is raised by the addition of a high redox reagent as per the first aspect.

Preferably the at least one metal is zinc and/or lead.

Preferably the solution in the third aspect is the bleed stream of the second aspect. Preferably also the solution of the third aspect is the leachate from the leaching process of the first aspect.

In a fourth aspect the present invention provides a method for removing dissolved silver and/or mercury from a metal halide solution, where the metal is capable of forming a cement with the silver and/or mercury, the method including the steps of:

(a) decreasing the Eh of the solution with a reductant to a level that causes precipitation of the metal;

(b) adding an ionic species to the solution that reacts with the precipitated metal in a manner that causes the silver and/or mercury to form a cement with the precipitated metal; and (c) removing the cement.

The formation of a metal precipitate and the addition of an ionic species results in a cementation of silver and/or mercury that is unique to the present invention, without the need to form and then introduce a separate amalgam.

The method of the fourth aspect typically provides for combined silver and mercury removal and has particular application in the treatment of chloride solutions derived from mineral ores containing both silver and mercury (which frequently naturally occur together in many as-mined ores).

A most preferred application of the method is in relation to zinc and copper chloride solutions (such as result from a zinc or copper ore leaching process). In this regard, the metal is zinc and/or copper and the halide is chlorine, and the method is preferably implemented when the copper is in its cuprous form. In at least preferred forms of the method, desirably silver and mercury are removed with the precipitation of only a minimal amount of copper as said metal.

Hereinafter Eh values are presented with reference to the standard Ag/AgCl electrode potential. Preferably the Eh of the solution is decreased to below 0 mV. The Eh can be decreased to as low as approximately −200 mV but is usually decreased to around −150 mV. A typical cuprous chloride process electrolyte has an Eh of around +150 mV and thus, when solution Eh is decreased to −150 mV, an extra 300 mV of driving force for the precipitation of silver is made available.

Preferably, the Eh is decreased by adding to the solution a reductant selected from one or more of: aluminium metal, zinc metal, metallic iron, or a metal hydride, borohydride or dithionite. The most preferred reductant is aluminium metal because it is cost effective, readily available, and causes the formation of a more easily filtered cement.

Sodium dithionite as reductant can also be used to decrease solution Eh, optionally with a final decrease in Eh being achieved by sodium borohydride (ie. at the end of the Eh decreasing step). By using a non-copper reductant any mercury present in the silver removal is not affected by alloying with larger amounts of copper.

Preferably the ionic species added is ionic mercury in either or both of mercurous or mercuric states (Hg(I) or Hg(II)). Other ionic species include ionic gold etc which is less economical. The use of an ionic species such as ionic mercury is preferred over the use of mercury metal for the problems identified above in U.S. Pat. No. 4,124,379.

Typically the cemented mercury is removed from the solution by passing an inert gas through the solution so that at least some of the mercury is removed therefrom with the gas. For example, the inert gas can be sparged into the solution and typically an inert gas such as nitrogen is employed (ie. because of its availability and low cost).

After removal from the solution, the inert gas is typically scrubbed to remove mercury therefrom before being recycled to the solution for further use. In this regard, the inert gas can be scrubbed with a cupric solution (ie. containing cupric ion) to remove recovered mercury therefrom. Other oxidants such as mercuric chloride can be used to scrub the mercury from the nitrogen. Carbon dioxide may also be employed.

Furthermore, the removal of mercury metal from the solution can be enhanced by heating the solution to cause additional mercury metal to vaporise. When an inert gas removal process is used, the increased amount of vaporised mercury metal is thus entrained in the gas.

Alternatively, mercury metal can be removed from the solution by passing the solution over activated carbon so that mercury metal is adsorbed onto the carbon. With this alternative, the mercury can then be removed from the activated carbon by passing a second solution over the activated carbon, the second solution having an Eh that is high enough to transform the adsorbed mercury into ionic mercury to thereby dissolve into the second solution.

This alternative method lends itself to ease of in-line implementation and is thus easier to commercialise; for example a column containing the activated carbon can be employed, and reduced Eh electrolyte (eg. at about −150 mV) can be pumped through the column in a continuous manner. Once a limiting amount of mercury has been adsorbed onto the carbon, an automatic switch over to pump the second solution through the column can be employed. Dissolved mercury can then be readily recovered from the second solution.

A typical application of the method of the fourth aspect is with zinc and/or cuprous chloride solutions occurring in hydrometallurgical-metal recovery processes. A typical Eh in hydrometallurgical processes utilising such solutions and prior to silver and/or mercury removal is about +150 mV.

BRIEF DESCRIPTION OF THE DRAWINGS

Notwithstanding any other forms which may fall within the scope of the present invention, preferred forms of the invention will now be described, by way of example, and also with reference to the accompanying drawing in which.

MODES FOR CARRYING OUT THE INVENTION

Zinc Recovery

Figure 1:
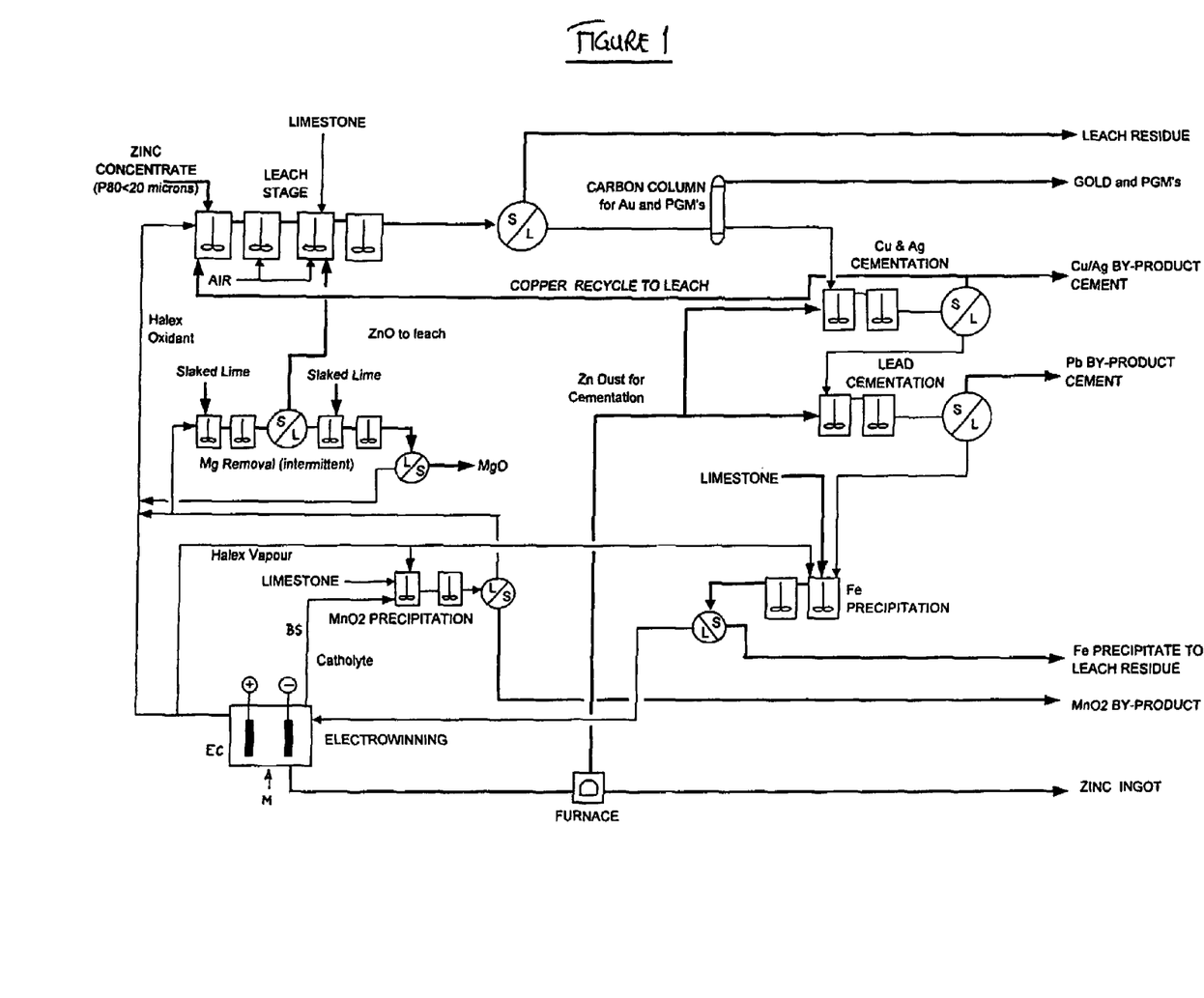
FIG. 1 shows a schematic process flow diagram illustrating a closed loop zinc leaching and electrolytic recovery process, including a manganese removal stage.

A preferred zinc recovery process according to the present invention is schematically depicted in FIG. 1 and the description of this process will now be made with reference to FIG. 1.

The process was designed to produce high purity zinc metal from complex mixed zinc/lead sulfide concentrates derived from zinc/lead ores. Lead and silver were produced as cement by-products while gold and platinum group metals (PGM's), when present, were produced as bullion.

Concentrates containing significant levels of iron were readily treated, with all leachable iron reporting to the leach residue as heamatite, while sulphide sulphur was converted to the elemental state. High levels of contaminants such as manganese and arsenic were also readily accommodated, with arsenic reporting to the leach residue as the environmentally stable iron arsenate and manganese rejected in a separate residue as manganese dioxide (described below).

The preferred process was based on the electrolytic deposition at the cathode of high purity zinc from a purified sodium chloride—sodium bromide electrolyte. During the electrowinning stage, a halide species was generated in solution at the anode. This species was a mixed halide species, such as soluble $BrCl_2^-$ (hereinafter "Halex"). The species exhibited powerful leaching characteristics when it was recirculated to treat incoming concentrate feed.

The preferred process included three main steps of leaching, purification and electrowinning, as shown in FIG. 1. The leaching step included a single leaching stage (reactor) and was combined with a series of subsequent stages (reactors). Zinc concentrate and an oxidant (the halide species) were fed to the leaching stage. Purification consisted of cementation and alkali precipitation steps. Electrowinning employed a number of diaphragm cells with the option for continuous product removal in dendritic form or the production of a conventional cathode plated with zinc.

Electrolysis of Zn (Electrowinning)

Electrowinning was an integral part of the preferred process. Zinc metal was electrowon from purified electrolyte, which had a composition of 100 gpl zinc, 50 gpl sodium chloride (common salt, NaCl), 50 gpl calcium chloride ($CaCl_2$) and 110 gpl sodium bromide (NaBr). All other constituents, including 'equilibrium' levels of many other elements (manganese, magnesium etc.), were regarded as impurities.

Electrolysis involved the passage of electric current at 500 $A/m^2$ of electrode area, to form high purity zinc on the negatively charged cathode. The feed electrolyte zinc concentration was in turn depleted from 100 to 50 gpl, which was the steady state concentration of the cell.

The Oxidant (Lixiviant)

The spent catholyte continuously permeated through a woven cloth membrane M positioned in an electrolysis cell EC (FIG. 1). The catholyte permeated to the positively charged electrode (anode).

Preferably chloride ($Cl^-$) and bromide ($Br^-$) were present in solution, and hence there was a preferential formation of the halide species $BrCl_2^-$ (Halex). However, other halide species were able to be formed. This species was considered as a chlorine molecule held in solution by a bromide ion and was observed to be a very powerful lixiviant at an oxidising potential (Eh) of 1000 mV (vs Ag/AgCl). The resultant Halex-bearing solution (electrolyte) from the anode compartment (anolyte) was used for the leaching of zinc sulfide concentrates.

Leaching Stage

Zinc concentrate and Halex oxidant from the electrolysis process were fed to a single stage leach (the first continuously stirred tank reactor (CSTR) in FIG. 1). The CSTR was operated at atmospheric pressure and to impart a temperature to the solution (electrolyte) of 85° C. The leaching (oxidation) reaction initially proceeded without air sparging (aeration (or introduction of air)) until all halex oxidant ($BrCl_2^-$) was consumed. Significant iron dissolution and oxidation of sulfide occurred in the first CSTR.

Second and third CSTR's were introduced for further aeration to reject iron as a ferric oxide precipitate. Any arsenic present was oxidised in the first CSTR and subsequently precipitated as the environmentally stable iron arsenate.

Recycle copper cement (ie. from a subsequent Cu & Ag cementation stage) was added to the first CSTR to enhance both oxygen uptake and metal extraction. The copper helped to catalyse the oxidation of the zinc concentrate by the halide species.

When leaching was complete limestone was added in a third CSTR to reject (precipitate) any dissolved iron that remained and any sulphate present. The limestone also balanced the generation of sulphuric acid as a result of sulphur oxidation in the first CSTR. Optionally a fourth CSTR was provided to increase residence (reaction) time and allow for maximum precipitation of iron and sulphate.

Purification Stage

The leach residue was separated from the zinc-rich pregnant solution by filtration and washed before disposal to landfill at first solid-liquid separation station (S/L).

When gold or PGM's were present they were extracted (oxidised) during leaching and were recovered by feeding the pregnant zinc solution through a column housing activated carbon and onto which the gold and PGM's were adsorbed. This carbon could then be separately eluted with an elutant to recover the gold and other PGM's.

The zinc-pregnant solution was then further purified via a series of cementation reactions with zinc dust reagent. This was a two-stage CSTR facilitated operation, with copper and silver predominantly removed in the first stage, which operated at a temperature of 85° C. In the second stage, excess zinc dust was added to remove the remaining impurities such as cadmium, lead, nickel, cobalt, thallium etc.

After two further solid-liquid separation stages, the now relatively pure zinc laden solution had added thereto, in a CSTR, a small amount of halex vapour from the electrolytic cell anolyte, until an Eh of 700 mV was achieved. This ensured that any remaining iron was oxidised to the ferric ($Fe^{3+}$) oxidation state. A subsequent addition of ground limestone to raise the pH to 4.5 precipitated most remaining impurities (eg. Bi, Fe, In, Ge, etc.). These precipitates were removed by filtration and were either discarded or reprocessed to recover economic by-products such as indium.

It was also apparent that at least some of the manganese was removable from the metal halide solution as a manganese dioxide precipitate if the pH was regulated to above 3.2 in this CSTR stage. The pH was raised above this level by the addition of calcium carbonate (typically ground limestone). At this pH, and at a redox potential of 600-800 mV vs Ag/AgCl (800-1000 mV vs SHE), the manganese entered the favourable $MnO_2$ stability region of a Pourbaix diagram. The manganese dioxide precipitate was then removed with the precipitated iron from the solution. The Eh was also adjusted (raised) by the addition of the high redox reagent Halex. The specific chemical reactions and reaction conditions for manganese removal are described in detail shortly in the following text for the subsequent manganese removal circuit (for a spent catholyte bleed stream) which also makes use of limestone and halex for this purpose. It is noted that, in the bleed stream to be described, typically the manganese concentration in solution is higher than it was in the present CSTR purification stage.

Any impurities now remaining were observed to not contaminate zinc during electrowinning and were removed in either the manganese or magnesium purification circuits. In particular, because the halide species was formed at the anode at an oxidation potential lower than that for the formation of manganese oxide, this metal did not contaminate the electrolytically recovered zinc.

The purified zinc solution was then electrolysed, as described above, to produce high purity zinc and to regenerate the halide species lixiviant for recycle to the leach. A zinc product was washed and dried under an inert atmosphere prior to melting in a furnace. Some zinc dust produced from zinc in the furnace was used in the cementation stages (described above).

Manganese and Magnesium Removal

These removal circuits treated a spent catholyte bleed stream, with limestone and halex used in the manganese circuit, and with slaked lime used in the magnesium circuit.

This process was observed to be generally applicable in the treatment of mineral concentrates containing manganese. In the present zinc recovery process the manganese leached into the leachate was removed in equal proportion (ie. removed at least at the rate of its leaching into the leachate) to prevent its accumulation in the process solution.

Up to a maximum of 20% of the total solution flow through the electrolytic cell EC was drawn off as a bleed stream BS from the spent catholyte. This stream was treated with Halex vapour and limestone to precipitate the manganese as manganese dioxide $MnO_2$.

The vapour pressure of Halex above the electrolyte was observed to be temperature dependent, and the vapour itself likely consisted of BrCl gas.

The manganese removal process is chemically depicted below in equations (1) to (3), where the Halex vapour was assumed to be BrCl.

$$Mn^{2+} + 2H_2O \Leftrightarrow MnO_2 + 4H^+ + 2e^- \quad (1)$$

$$BrCl + 2e^- \Leftrightarrow Br^- + Cl^- \quad (2)$$

$$2H_2O + Mn^{2+} + BrCl \rightarrow MnO_2 + Br^- + Cl^- + 4H^+ \quad (3)$$

$$2H_2O + Mn^{2+} + BrCl \rightarrow MnO_2 + Br^- + Cl^- + 4H^+ \quad (3)$$

$$2CaCO_3 + 4H^+ \rightarrow 2Ca^{2+} + 2CO_2 + H_2O \quad (4)$$

$$Mn^{2+} + 2CaCO_3 + BrCl \rightarrow MnO_2 + 2Ca^{2+} + Br^- + Cl^- + 2CO_2 \quad (5)$$

The electrolyte composition in the spent catholyte was approximately 50 gpl NaCl, 110 gpl NaBr, 50 gpl $CaCl_2$, and 50 gpl $Zn^{2+}$. However, the manganese removal process was also able to be performed on the process electrolyte prior to electrolysis. When using a bleed stream from the spent catholyte of the zinc electrowinning cell, the manganese level in solution depended on the quantity leached into solution and the size of the bleed stream going to Mn removal.

The present inventors demonstrated that manganese was completely removed from the bleed stream as manganese dioxide by the addition of Halex vapour thereto. The electrolyte-vapour reaction was discovered to be extremely rapid in the presence of incrementally added small quantities of limestone.

Figure 2:
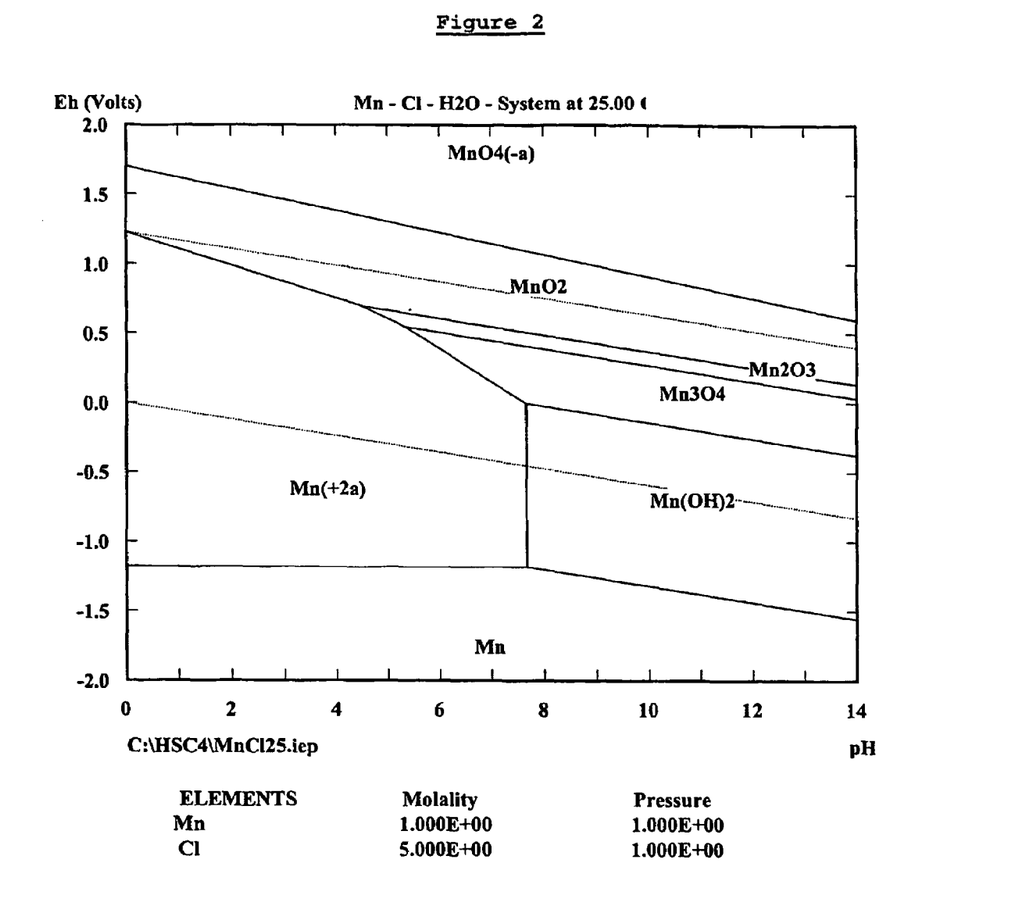
FIG. 2 shows a Pourbaix diagram for the Mn—Cl—H2O system at 25° C.

The manganese precipitation as manganese dioxide is predicted by the Pourbaix diagram shown in FIG. 2. As can be seen, manganese does not precipitate at neutral redox potential until above pH 7.5. At high redox potential, 600-800 mV vs Ag/AgCl (800-1000 mV vs SHE) and pH 3.2, however, the manganese entered the $MnO_2$ stability region and was able to be precipitated as $MnO_2$.

A small amount of zinc was also precipitated during the manganese removal. However, the present inventors demonstrated that less zinc was precipitated at lower aqueous zinc levels (eg 25 gpl $Zn^{2+}$ instead of 50 gpl $Zn^{2+}$), or when the limestone was incrementally added in small amounts to maintain a pH of around 3.2 (as opposed to precipitating the manganese in the presence of a stoichiometric excess of limestone).

Thus, by using a spent catholyte containing 50 gpl $Zn^{2+}$ and 15 gpl $Mn^{2+}$, with the slow addition of limestone, only 7.8% of the zinc in solution was co-precipitated with the manganese. For an 8% catholyte bleed stream, this equated to the loss of less than 0.7% of the total zinc production to the bleed stream precipitate.

Examples of successful manganese removal experiments are shown below. As can be seen, complete removal of the manganese was effected in the first two experiments, while complete removal was not attempted in the third experiment. It should be noted that the intermediate zinc assays in solution were only an approximate guide, as the zinc precipitated from solution was difficult to distinguish from the experimental error associated with this assay. Accurate determinations of the zinc precipitation were determined by direct analysis of the final residue.

The results from Experiments 2 and 3, shown in Tables 2 and 3, reflect the way that the technique was applied to a lead/zinc process in which Halex was anodically formed. The results indicated that for an 8% bleed from the spent catholyte a recirculating manganese concentration at 15 gpl was maintained. The co-precipitation of zinc with the $MnO_2$ precipitation represented a loss of approximately 0.6% of the total zinc production.

Manganese Removal Examples

Non-limiting examples of manganese removal processes will now be described.

EXAMPLE 1

An electrolyte comprising 200 gpl NaCl, 150 gpl NaBr, 30 gpl $Ca^{2+}$, 25 gpl $Zn^{2+}$ and 5 gpl $Mn^{2+}$ was prepared as a typical bleed stream from a lead/zinc recovery process. 25 gpl $CaCO_3$ was added to the electrolyte in a reaction vessel at the commencement of the removal process. $Ca(OCl)_2$ was added directly to the electrolyte to oxidise the solution. The temperature of the solution was maintained at a typical process electrolyte temperature of 60° C. to 65° C. The results are shown in Table 1 below.

EXAMPLE 2

An electrolyte comprising 50 gpl NaCl, 110 gpl NaBr, 50 gpl $CaCl_2$, 50 gpl $Zn^{2+}$ and 15 gpl $Mn^{2+}$ was prepared as a typical bleed stream from a lead/zinc recovery process. 85 gpl $CaCO_3$ was added to the electrolyte in a reaction vessel at the commencement of the removal process. Halex vapours were generated externally and pumped into the reaction vessel. The temperature of the solution was maintained at a typical process electrolyte temperature of 60° C. to 65° C. The results are shown in Table 2 below.

EXAMPLE 3

An electrolyte comprising 50 gpl NaCl, 110 gpl NaBr, 50 gpl $CaCl_2$, 50 gpl $Zn^{2+}$ and 15 gpl $Mn^{2+}$ was prepared as a typical bleed stream from a lead/zinc recovery process. $CaCO_3$ was added to the electrolyte in a reaction vessel in small doses throughout the removal process. Halex vapours were generated externally and pumped into the reaction vessel. The temperature of the solution was maintained at a typical process electrolyte temperature of 60° C. to 65° C. The results are shown in Table 3 below.

EXAMPLE 4

10.0 g of the manganese precipitate from Example 2 was added to 1.0 litre of demineralised water in a reaction vessel. $H_2SO_4$ was added. The results are shown in table 4 below.

EXAMPLE 5

10.0 g of precipitate from Example 3 were added to 1.0 litre of demineralised water in a reaction vessel. Halex vapours were generated externally and pumped into the reaction vessel. $H_2SO_4$ was added. The results are shown in Table 5 below.

TABLE 1

Results from Experiment 1

| Time (min) | pH | Eh (mV vs Ag/AgCl) | Mass $Ca(OCl)_2$ Added (g) | Zn Abs | Zn % Removed | Mn Abs | Mn % Removed |
|---|---|---|---|---|---|---|---|
| 10 | 4.7 | 480 | 0 | 1018 | 0% | 297 | 0% |
| 25 | 4.5 | 470 | 2.2 | 1018 | 0% | 283 | 5% |
| 40 | 4.4 | 520 | 4.1 | 1015 | 0% | 265 | 11% |
| 55 | 4.4 | 570 | 6.2 | 1016 | 0% | 257 | 13% |
| 70 | 4.3 | 550 | 7.9 | 1011 | 1% | 227 | 24% |
| 85 | 4.3 | 570 | 10.1 | 1010 | 1% | 206 | 31% |
| 110 | 4.3 | 560 | 12.2 | 1010 | 1% | 186 | 37% |
| 120 | 4.1 | 610 | 16.4 | 1009 | 1% | 147 | 51% |
| 135 | 3.9 | 660 | 25.9 | 1013 | 0% | 73 | 75% |
| 160 | 3.8 | 690 | 32.3 | 996 | 2% | 16 | 95% |
| 180 | 3.8 | 790 | 38.0 | 994 | 2% | ND | 100% |

TABLE 1-continued

| | Mass | Zn Content |
|---|---|---|
| Residue | 24.3 g | 5.1% |
| Zinc Loss as Percentage of Total Production | | 0.4% |

TABLE 2

Results from Experiment 2

| Time (min) | pH in Reactor | Eh (mV vs Ag/AgCl) | 32% HCl Added to Reactor (ml) | Zn in Solution (AAS Abs) Abs | % Removed | Mn in Solution (AAS Abs.) Abs | % Removed |
|---|---|---|---|---|---|---|---|
| 0 | 2.0 | 470 | 0 | 361 | 0% | 821 | 0% |
| 30 | 4.6 | 390 | 3 | 339 | 6% | 791 | 4% |
| 60 | 4.4 | 500 | 10 | 340 | 6% | 726 | 12% |
| 110 | 4.3 | 520 | 20 | 331 | 8% | 661 | 19% |
| 170 | 4.3 | 550 | 36 | 311 | 14% | 460 | 44% |
| 210 | 4.2 | 540 | 46 | 305 | 16% | 336 | 59% |
| 255 | 4.3 | 560 | 62 | 306 | 15% | 173 | 79% |
| 280 | 3.7 | 750 | 72 | 290 | 20% | 66 | 92% |
| 310 | 3.6 | 790 | 72 | 286 | 21% | 5 | 99% |
| 1320 | 4.4 | 770 | 72 | 291 | 19% | ND | 100% |

| | Mass | Zn Content |
|---|---|---|
| Residue | 53.6 g | 16.5% |
| Zinc Loss as Percentage of Total Production | | 1.5% |

TABLE 3

Results from Experiment 3

| Time (min) | pH | Eh (mV) | HCl Added to Halex Tank (ml) | $CaCo_3$ Added to Reaction Tank (g) | Zn in Solution (AAS Abs) (ppm) | % Removed | Mn in Solution (AAS Abs.) (ppm) | % Removed |
|---|---|---|---|---|---|---|---|---|
| 0 | 1.0 | 520 | 0 | 0.0 | 51.1 | 0% | 16.3 | 0% |
| 25 | 3.8 | 600 | 6 | 1.3 | 52.0 | −2% | 15.9 | 2% |
| 45 | 3.2 | 710 | 12 | 1.3 | 50.4 | 1% | 16.0 | 2% |
| 55 | 2.9 | 750 | 15 | 1.3 | 51.9 | −2% | 16.4 | −1% |
| 70 | 2.6 | 780 | 15 | 1.3 | 51.3 | 0% | 15.7 | 4% |
| 90 | 3.2 | 720 | 18 | 2.7 | 50.5 | 1% | 15.8 | 3% |
| 135 | 3.3 | 700 | 24 | 8.0 | 51.4 | −1% | 14.3 | 12% |
| 200 | 3.2 | 700 | 36 | 16 | 52.4 | −3% | 11.6 | 29% |
| 260 | 3.3 | 760 | 50 | 25 | 51.6 | −1% | 9.0 | 45% |
| 290 | 3.3 | 780 | 57 | 33 | 48.7 | 5% | 6.5 | 60% |
| 330 | 3.3 | 780 | 68 | 42 | 47.8 | 6% | 4.1 | 75% |
| 1450 | — | — | 68 | 42 | 47.7 | 7% | 3.8 | 77% |

| | Mass | Zn Content |
|---|---|---|
| Residue | 43.2 g | 9.6% |
| Zinc Loss as Percentage of Total Production | | 0.62% |

TABLE 4

Results from Experiment 4

| Time (min) | pH | Eh (mV vs Ag/AgCl) | 9.8% H$_2$SO$_4$ Added (ml) | Zn in Solution (ppm) | Zn Dissolved (% of Start) | Mn in Solution (ppm) | Mn Dissolved (% of Start) |
|---|---|---|---|---|---|---|---|
| 0 | 3.5 | 390 | 0 | — | — | — | — |
| 15 | 6.6 | 230 | 1 | <10 | <0.6% | <10 | <0.4% |
| 20 | 6.0 | 280 | 3 | <10 | <0.6% | <10 | <0.4% |
| 30 | 5.7 | 390 | 6 | <10 | <0.6% | <10 | <0.4% |
| 35 | 5.4 | 440 | 9 | 41 | 2.5% | <10 | <0.4% |
| 45 | 5.1 | 450 | 15 | 97 | 5.9% | 13 | 0.5% |
| 60 | 4.3 | 530 | 21 | 228 | 14% | 51 | 1.8% |
| 70 | 3.5 | 630 | 27 | 529 | 32% | 214 | 7.7% |
| 80 | 2.9 | 710 | 33 | 808 | 49% | 410 | 15% |
| 180 | 2.1 | 830 | 40 | 1020 | 62% | 562 | 20% |

| | Mass | Zn (%) | Zn Dissolved |
|---|---|---|---|
| Residue | 4.0 g | 7.9% | 82% |

| Adjusted Zinc Loss as Percentage of Total Production | 0.26% |
|---|---|

TABLE 5

Results from Experiment 5

| Time (min) | pH | Eh (mV vs Ag/AgCl) | 9.8% H$_2$SO$_4$ Added (ml) | Zn in Solution (ppm) | Zn Dissolved (% of Start) | Mn in Solution (ppm) | Mn Dissolved (% of Start) |
|---|---|---|---|---|---|---|---|
| 0 | 5.0 | 295 | 0 | 336 | — | 55.2 | — |
| 15 | 3.4 | 810 | 4.0 | 578 | <0.6% | 77.7 | <0.4% |
| 25 | 2.9 | 860 | 4.0 | 607 | <0.6% | 80.4 | <0.4% |
| 35 | 2.3 | 900 | 6.0 | 646 | <0.6% | 88.7 | <0.4% |
| 45 | 1.9 | 910 | 10.0 | 696 | 2.5% | 88.3 | <0.4% |
| 55 | 1.6 | 900 | 15.0 | 587 | 5.9% | 91.0 | 0.5% |
| 60 | 1.4 | 920 | 25.0 | 460 | 14% | 95.7 | 1.8% |
| 75 | 1.4 | 920 | 25.0 | 508 | 32% | 109 | 7.7% |

| | Mass | Zn (%) | Zn Dissolved |
|---|---|---|---|
| Residue | 4.1 g | 3.6% | 83% |

| Adjusted Zinc Loss as Percentage of Total Production | 0.10% |
|---|---|

Manganese was thus completely removed from the bleed stream as manganese dioxide by the addition of Halex vapour. The electrolyte-vapour reaction was discovered to be extremely rapid in the presence of small quantities of limestone.

A small amount of zinc was also precipitated during the manganese removal. However, less zinc was precipitated at lower aqueous zinc levels (eg 25 gpl $Zn^{2+}$ instead of 50 gpl $Zn^{2+}$), or when the limestone was added incrementally in small amounts to maintain a pH of around 3.2 (as opposed to precipitating the manganese in the presence of a stoichiometric excess of limestone).

Thus, by using a spent catholyte containing 50 gpl $Zn^{2+}$ and 15 gpl $Mn^{2+}$ with the slow addition of limestone, only 8.4% of the zinc in solution was co-precipitated with the manganese. For an 8% catholyte bleed stream, this equated to the loss of less than 0.7% of the total zinc production to the bleed stream precipitate.

In the magnesium removal process, spent catholyte from the manganese removal process had, in a series of CSTR's, slaked (or caustic) lime added thereto to cause the precipitation in the first two CSTR's of zinc. This zinc was then returned to the leaching process, typically at the limestone addition stage (as shown in FIG. 1). Then, in two further CSTR's more slaked lime was added to cause the precipitation of magnesium oxide and thereby prevent the build up of magnesium in the process. This removal step was only required intermittently, because of the generally lower levels of magnesium in the zinc mineral. The treated spent catholyte was then returned to the leaching process, typically to the first leaching CSTR.

The economics of the preferred zinc recovery process in which Halex was anodically formed were noted be site specific. For a concentrate producer, the loss of 0.6% of zinc production as a result of impurity removal (especially of manganese) represented a significant improvement over prior art smelter losses, where approximately 4% of the contained zinc was deducted before calculating the payable metal content. However, where higher zinc recoveries in the process were desirable, some of the zinc precipitated from solution with the manganese was recovered by re-slurrying the bleed stream precipitate in water and acidifying with sulfuric acid. The zinc was able to be redissolved with approximately 90% selectivity. Allowing for the higher bleed stream ratio required to account for the partial redissolution of the manganese, the zinc loss with the bleed stream precipitate was reduced to 0.1% of total zinc production.

An important feature of the preferred process was that all impurities including manganese, mercury and arsenic were either recovered as saleable by-products or stabilised for disposal to tailings. Another equally important feature was that heat was provided by the exothermic leach reactions. This, coupled with the addition of air to the leach, evaporated water and thereby maintained the water balance at neutral. As such, there was no liquid effluent.

Silver & Mercury Removal

Preferred embodiments of silver and mercury removal will now be described with reference to a cuprous chloride leachate, but it should be appreciated that the invention can be used with other metal chloride solutions (including zinc chloride).

In the electrolytic production of copper, the typical Eh of a cuprous solution in contact with metallic copper was observed to be around +150 mV (ref. Ag/AgCl). Surprisingly, it was found possible to chemically decrease the Eh of the cuprous solution to −150 (Ag/AgCl) with minimal precipitation of metallic copper. This allowed an extra 300 mV of driving force for the precipitation of silver. In addition, the effectiveness of silver-mercury amalgam formation was not greatly reduced by alloying with Cu. Some Cu was observed to co-precipitate with the silver/mercury amalgam but the amount of Cu in the amalgam (residue) was observed to be 1/20 of the amount in the residue of prior art processes, thereby making recovery of silver and mercury much simpler.

Following the removal of silver, it was found possible to remove traces of mercury from the cuprous solution by sparging with nitrogen. After sparging, the nitrogen was scrubbed with, for example, a cupric solution to remove the entrained mercury therefrom. The nitrogen was then recycled to the solution for further mercury removal.

Silver/Mercury Removal Examples

EXAMPLE 6

An improved process for the removal of silver and mercury from chloride solutions was developed using an improved reductant, namely, aluminium metal, which was observed to be a cheap and readily available reductant over those described below and over zinc dust or metallic iron.

In addition, the use of aluminium metal caused the formation of a sponge-like copper precipitate in copper chloride solutions which, after subsequent cementation of silver and/or mercury, was easier to filter than that arising from other reductants. Further the aluminium was entrained in this precipitate whereas zinc dust was not, and the aluminium could thus be removed from the solution with the cement. Metallic iron developed a skin of copper and its core did not react, thus rendering it less effective as a reductant.

In the improved process for the removal of silver and mercury from chloride solutions, metallic aluminium was added in small amounts (0.05-0.3 grams per litre of electrolyte) to the electrolyte, causing a decrease in the solution Eh to −120 to −150 mV (vs Ag/AgCl), and precipitation of high surface area copper. This copper was observed to be a relatively coarse sponge-like precipitate. It was highly reactive with the added mercury ions, and capable of forming an amalgam with a chemical composition in which there was about 7.5% silver, copper varying from 10% up to 50%, with the balance mercury.

The amalgam formed through aluminium addition was also of a more consistent and more readily filterable particle size. This represented an improvement over prior art processes for the separation of the solid and liquid phases.

The mercury levels in the solution exiting this step were similar to those described for Example 8, and the same mercury removal steps were used (nitrogen sparging or adsorption onto activated carbon) as described below.

Figure 3A:
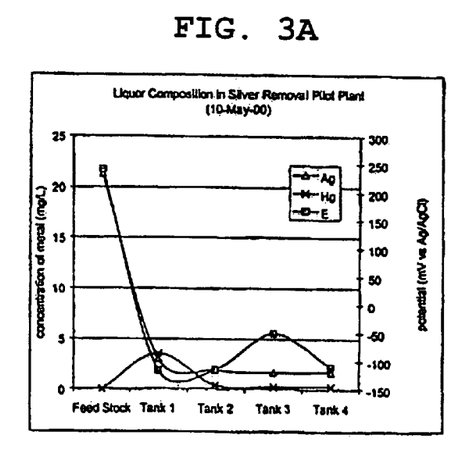
FIGS. 3A and 3B are a plot of silver and mercury removal against progress.
Figure 3B:
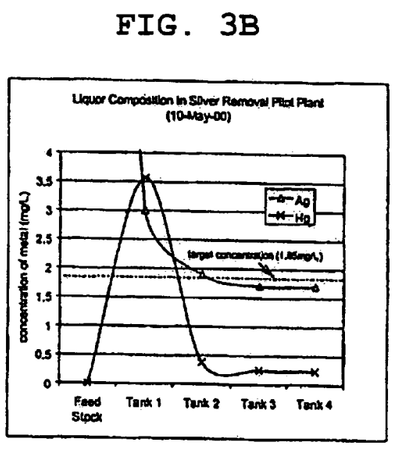

The improved process was tested at the bench scale before being proven over a 48-hour operation at the pilot scale at a continuous process solution flow rate of 20 l/hr. The pilot plant was operated through four 20 litre nitrogen-sparged tanks, with aluminium foil added in tank 1 at a dosing rate of 0.05 to 0.15 grams per litre of electrolyte (1 to 3 g/hr), and ionic mercury (eg. mercurous and mercuric nitrate) added at tank 1 at a 3:1 mass ratio with the silver feed (1.5 g/hr). The electrolyte treated contained concentrations of 75 gpl $Cu^+$, 280 gpl NaCl and 28 gpl NaBr at 35° C. FIG. 3A and FIG. 3B shows the average silver, mercury and Eh results for the 48 hours of operation.

As can be seen, the average silver concentration in Tanks 3 and 4 throughout the 48 hours of operation was 1.5 mg/L, with a minimum concentration of 1.2 mg/L. The mercury concentration ranges observed were as shown in Table 6.

TABLE 6

| Range of mercury concentrations across the pilot plant - 48 hour run. | | | |
|---|---|---|---|
| Tank No. | No of assays | Average (µg/L) | Range (µg/L) |
| 1 | 6 | 6311 | 815-24700 |
| 2 | 6 | 1293 | 337-4300 |
| 3 | 6 | 468 | 275-773 |
| 4 | 6 | 322 | 277-388 |

EXAMPLE 7

In this example the reductant was sodium borohydride but it was observed that other reductants could also be used such as sodium dithionite and metal hydrides (eg. sodium and calcium hydride, optionally and in combination with sodium borohydride to reduce the amount of borohydride used). A more cost effective method involved employing sodium dithionite to perform the bulk of Eh reduction (ie. typically down to a limiting level) with the final Eh reduction being performed by sodium borohydride (ie. to achieve a preferred lower level around −150 mV (Ag/AgCl)).

By contrast to the use of aluminium metal as reductant, sodium borohydride caused the precipitation of an ultra-fine copper sponge and, with the addition of ionic mercury, the formation of an amalgam that was difficult and expensive to filter and that was less stable. Also, the borohydride species itself was both expensive and unstable in water. Unless stored at high pH, the borohydride species rapidly hydrolysed, causing wastage of the expensive reagent. Similarly, the fine amalgam formed after addition of the mercury and sodium borohydride had to be absolutely protected from oxidation or it rapidly redissolved, releasing silver and mercury ions back into solution. Notwithstanding these diffulties, it was also possible to use sodium borohydride as a reductant, and with the addition of ionic mercury (Hg(I) or Hg(II), mercurous or mercuric respectively), a metal amalgam of copper, mercury and silver was formed, resulting in the removal of both mercury and silver from solution.

Silver Removal 45 mg of $NaBH_4$ was added to 1.5 litres of reduced copper electrolyte containing 22 ppm of silver, causing the Eh of the solution to drop from +120 mV to −135 mV (Ag/AgCl). 65 mg of mercury as mercuric nitrate was added to the electrolyte and caused the level of silver in the solution to drop from 22 ppm to 4.4 ppm in 40 minutes. Another 65 mg of mercury was added as mercuric nitrate and within 20 minutes the level of silver had dropped to 1 ppm. The precipitated solids were filtered and dried and were found to contain 7.4% silver, and contents of copper varying from 10% up to 47%, with the balance mercury.

The process was repeated using soidum dithionite to achieve Eh levels less than 0 mV, with the final Eh decrease being achieved by smaller amounts of $NaBH_4$.

EXAMPLE 8

Mercury Removal

The cuprous electrolyte from the Silver Removal Example 7 was adjusted to −150 mV by adding a reductant such as aluminium or $NaBH_4$ thereto. This shifted the usual solution equilibrium (ie. between mercury metal, mercurous ion and mercuric ion) towards the formation of mercury metal. Nitrogen gas was then sparged into the so-treated electrolyte for 1 hour. During this period the mercury content of the electrolyte was observed to drop from 0.29 ppm to 0.037 ppm. The removal of mercury was observed to be increased by heating the solution during nitrogen sparging.

Figure 4:
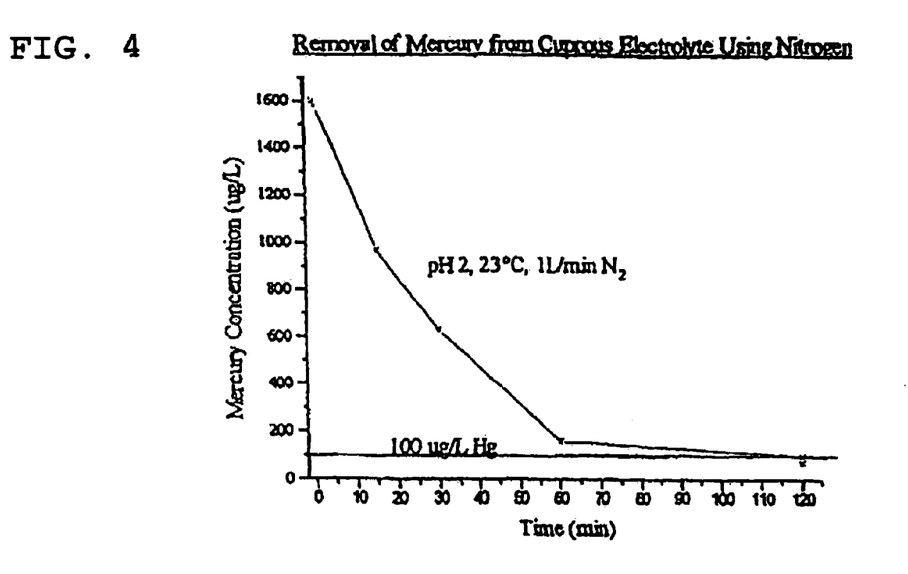
FIG. 4 is a plot of the removal of mercury with time from a cuprous electrolyte using nitrogen sparging.

In a second test, an initial mercury concentration of 1600 □g/l was reduced to 150 □g/l in 60 minutes and 100 □g/l in 120 minutes. The results are shown in FIG. 4.

EXAMPLE 9

Alternative Mercury Removal

The Eh of a cuprous electrolyte from the Silver Removal Example 2 containing 500 µg/l mercury was adjusted to around −150 mV (Ag/AgCl). This solution was then passed (eg. pumped under pressure) through a column packed with activated carbon, at a rate of 4 ml/min (for the first three hours) and then 20 ml/min (for the next 2 hours). The metallic mercury was adsorbed onto the activated carbon, reducing the solution concentration to less than 55 µg/l. The metallic mercury was then separated from the activated carbon by passing a second different solution of high Eh through the column, thereby transforming the metallic mercury into dissolved ionic mercury to pass out of the column in the second solution. The mercury was subsequently recovered from the second solution.

The above described experimental procedures showed that very effective removal of both silver and mercury was able to be achieved without the need to employ copper (as per the prior art). Also, the removal processes were easy to implement. The simplicity of the process lent itself readily to being scaled up to full commercial and continuous implementation.

The zinc recovery process according to the present invention had the following clearly identifiable advantages over the prior art roast/leach/electrowin zinc process and other hydrometallurgical processes:

Significantly lower operating and capital costs;
Recovery of precious metals in the zinc leach circuit (eg. in the purification of the non-zinc metals from solution, the recovery of saleable copper, lead and silver metals (Cu, Ag, Pb and Fe in the cementation and precipitation stage of FIG. 1));
Tolerance to low grade and "dirty" concentrates;
Low energy consumption;
No liquid emissions;
No production of noxious gases;
Mild operating conditions of low temperature and atmospheric pressure;
No need for solvent extraction; and
No requirement for pure oxygen in aeration stages.

Whilst the invention has been described with reference to a number of preferred embodiments, it should be appreciated that the invention can be embodied in many other forms.

The invention claimed is:

1. A process for the recovery of zinc metal from a zinc mineral which may have iron therein, comprising the steps of:
   (i) leaching the zinc mineral wherein the zinc leaching step consists of a single stage using a solution including a halide species formed from two or more different halides, to leach the zinc into the solution
   (ii) passing the solution from (i) to an aeration stage in which air is introduced to oxidize and precipitate iron present in the mineral;
   (iii) electrolysing the zinc-bearing solution from (ii) to yield zinc metal and to generate the halide species; and
   (iv) returning the electrolysed solution including the halide species to the leaching step.

2. A process as claimed in claim 1 wherein the halide species is anodically formed in the electrolysis step.

3. A process as claimed in claim 2 wherein the halide species is formed at an oxidation potential lower than that for the formation of insoluble forms of impurities in the solution.

4. A process as claimed in claim 1 wherein the two or more different halides are chlorine and bromine and the halide species is a soluble halide complex.

5. A process as claimed in claim 4 wherein the halide species is $BrCl_2$ and/or $BrCl$ gas.

6. A process as claimed in claim 1 wherein the leaching of the mineral by the halide species is facilitated by a catalyst which catalyses the oxidation of the mineral.

7. A process as claimed in claim 6 wherein the catalyst is a metal catalyst which is either present in the zinc mineral or is introduced into the leaching process.

8. A process as claimed in claim 6 wherein the catalyst is copper.

9. A process as claimed in claim 1 wherein the mineral comprises sulphur and the process comprises the further step of adding limestone to balance the generation of sulphuric acid as a result of sulphur oxidation in the leaching stage, as calcium sulphate.

10. A process as claimed in claim 9 wherein leachate from the leaching process, prior to electrolysis, has any gold and platinum group metals present therein removed therefrom by passing the leachate over activated carbon to absorb the gold and platinum group metals onto the carbon.

11. A process as claimed in claim 10 wherein leachate from the leaching process, prior to electrolysis, is passed to a series of cementation processes in which zinc dust is added to the leachate to cement out any copper, silver, lead and other impurities present in the leachate.

12. A process as claimed in claim 1 wherein the leachate from the leaching process, prior to electrolysis, is passed to a further iron removal stage in which limestone and a halide species from the electrolysis step are added to oxidize and precipitate iron as ferric oxide.

13. A process as claimed in claim 12 wherein a portion of the electrolysed solution is removed and processed to remove manganese therefrom.

14. A process as claimed in claim 13 wherein said portion is a bleed stream from a cathode compartment of an electrolytic cell of the electrolysis process, with the bleed stream having added thereto limestone and the halide species from an anode compartment of the electrolysis process, to precipitate manganese dioxide.

15. A process as claimed in claim 14 where in the pH and Eh of the solution are regulated in a manner that favors the formation of the manganese dioxide precipitate over the formation of a precipitate of zinc.

16. A process as claimed in claim 15 wherein the pH is regulated by the incremental addition of the limestone to raise the solution pH to a level at which the Eh can be increased by the halide species to a level at or above which $MnO_2$ formation is favored.

17. A process as claimed in claim 16 wherein the amount of limestone added is less than the stoichiometric amount required for $MnO_2$ formation, such that less of the zinc is precipitated.

18. A process as claimed in claim 17 wherein, prior to returning the electrolysed leachate to the leaching process, a portion of the electrolysed leachate from a cathode compartment of the electrolysis process is passed to a magnesium removal stage in which slaked lime is added to firstly remove any zinc (which is returned to the leaching process) and then to remove the magnesium as a magnesium oxide precipitate.

19. A process as claimed in claim 12 wherein when the leachate from the leaching process, prior to electrolysis, is passed to the iron removal stage, the limestone and halide species oxidize and precipitate at least a portion of the manganese present as manganese dioxide.

* * * * *